United States Patent [19]
Blancett

[11] 3,949,606
[45] Apr. 13, 1976

[54] FLUID METER AND ADAPTER UNITS THEREFOR

[76] Inventor: Joe H. Blancett, 4729 Jacksboro Highway, Wichita Falls, Tex. 76302

[22] Filed: Sept. 13, 1974

[21] Appl. No.: 505,839

Related U.S. Application Data

[63] Continuation-in-part of Ser. No. 396,002, Sept. 10, 1973, abandoned, which is a continuation of Ser. No. 154,341, June 18, 1971, abandoned.

[52] U.S. Cl. .................................... 73/229; 73/258
[51] Int. Cl.² .................... G01F 1/115; G01F 3/12
[58] Field of Search ............. 73/229, 257, 258, 272

[56] References Cited
UNITED STATES PATENTS

| | | | |
|---|---|---|---|
| 749,066 | 1/1904 | Kelly | 73/258 |
| 1,871,912 | 8/1932 | Patch | 73/258 |
| 2,354,563 | 7/1944 | Weisse | 73/272 |
| 3,169,398 | 2/1965 | Sparling et al. | 73/231 |
| 3,248,583 | 4/1966 | Kullmann | 73/258 X |
| 3,369,399 | 2/1968 | Coffman et al. | 73/258 |
| 3,435,679 | 4/1969 | Davis | 73/258 |
| 3,523,455 | 8/1970 | Branitzky | 73/258 |
| 3,526,133 | 9/1970 | Love et al. | 73/229 |
| 3,554,032 | 1/1971 | Schneider, Jr. | 73/229 |
| 3,826,138 | 7/1934 | Rittenhouse | 73/258 |

*Primary Examiner*—Herbert Goldstein
*Attorney, Agent, or Firm*—Pravel & Wilson

[57] ABSTRACT

New and improved fluid meters which include a flow-responsive apparatus, either a rotating disk or rotating paddle, moving a driving magnet which causes movement of a driven magnet, driving a gear which causes a register to indicate fluid flow. The magnets are mounted in a fluid-tight adapter unit which is also adapted for use to replace complex gear structure of worn meters.

8 Claims, 13 Drawing Figures

Joe H. Blancett
INVENTOR

BY

Pravel Wilson & Matthews
ATTORNEYS

FLUID METER AND ADAPTER UNITS THEREFOR

CROSS-REFERENCE TO RELATED APPLICATIONS

The present application is a continuation-in-part of my prior co-pending U.S. patent application, Ser. No. 396,002, filed Sept. 10, 1973, now abandoned which is a continuation of my prior co-pending U.S. patent application, Ser. No. 154,341, filed June 18, 1971 now abandoned.

BACKGROUND OF THE INVENTION

The present invention relates to fluid meters.

Prior art fluid meters required numerous and complex gears and structure driving a register or indicator to accurately measure amounts of fluid flowing through such meters. The numerous and complex gears made such prior art fluid meters bulky, complex and expensive. In such prior art meters, the gears and structure were mounted within the chamber through which the fluid passed, and thus exposed to the fluid, reducing the effectiveness and service life of such gears, particularly when the fluid had corrosive ingredients therein, as in fluid meters used in oil field equipment. Certain of the prior art meters suspended a rotor, driven by the fluid passing through the meter directly from the register driving arrangement by means of supporting bushings. As the bushings supporting such rotor wore during use of the meter, the rotor would loosen with respect to the register drive during rotation, causing inaccurate measurements.

Prior art magnetic couplings, such as those described in U.S. Pat. Nos. 2,354,563; 3,248,853; 3,435,679; Re: 26,654 and 3,526,133 have used magnets to couple motion of a flow sensor to a clock or register.

However, these couplings have generally left at least one of the two magnets in an uncovered or exposed position in a fluid chamber of the meter, where these magnets were subjected to corrosive action of the fluid and further were susceptible to becoming clogged by debris and particulate matter in the fluid. In addition, certain of these meters separated the two magnets of the coupling by a chamber wall. Since the chamber had to withstand fluid pressures present in the meter, it was often of such a thickness as to impair magnetic coupling of the magnets.

SUMMARY OF THE INVENTION

Briefly, the present invention provides a new and improved fluid meter for measuring the flow of a fluid through a conduit wherein the fluid flows and passes through a fluid chamber and contacts a movable member which senses the flow of the fluid and moves a driving means. In a first embodiment of the present invention, the movable member is a paddle and rotor arrangement rotating in response to the fluid flowing through the fluid chamber, while in a second embodiment, the movable member is a nutating disk which oscillates or wobbles within the fluid chamber in response to the fluid flowing therethrough. Structural modifications have been made in the nutating disk chamber for improved performance. The driving means has a single driving gear mounted therewith which engages a single external gear of a register, causing the register to indicate the fluid flow. The gears are protected from the fluid by seals which prevent such fluid from contacting the gears and protects the gears from undue wear and corrosion due to harsh or corrosive ingredients in the fluid. Also, the driving means may be propelled by magnetic interaction between a pair of magnets in the present invention, providing sensitive and accurate measurement of the fluid flow.

The driving magnets which provide magnetic interaction are mounted within, and enclosed, by a protective capsule which is adapted to be mounted in a counterbore of either a paddle and rotor meter or a nutating disk meter. The magnets in the protective capsule may be supplied with new meters or as adapter units to replace mechanical gears in worn meters.

DESCRIPTION OF PREFERRED EMBODIMENT

In the drawings, the letter M designates generally the new and improved fluid meters of the present invention for use in measuring the flow of a fluid, such as water, gas, oil or other fluids through a pipe or conduit, and giving an indication of the amount of such fluid. The meters of the present invention are compact, sensitive and accurate and eliminate numerous gears thereby reducing the size and complexity of the meter. The meters of the present invention further protect the gears and driving elements driving the gears from corrosion and wear due to harsh or corrosive ingredients in the fluid.

The meter M includes a fluid chamber F (FIG. 1) which is mounted with a conduit or pipe system C and senses the flow of fluid through such conduit, driving a register or clock R which is mounted with the fluid chamber F in a register housing H.

Figure 1:
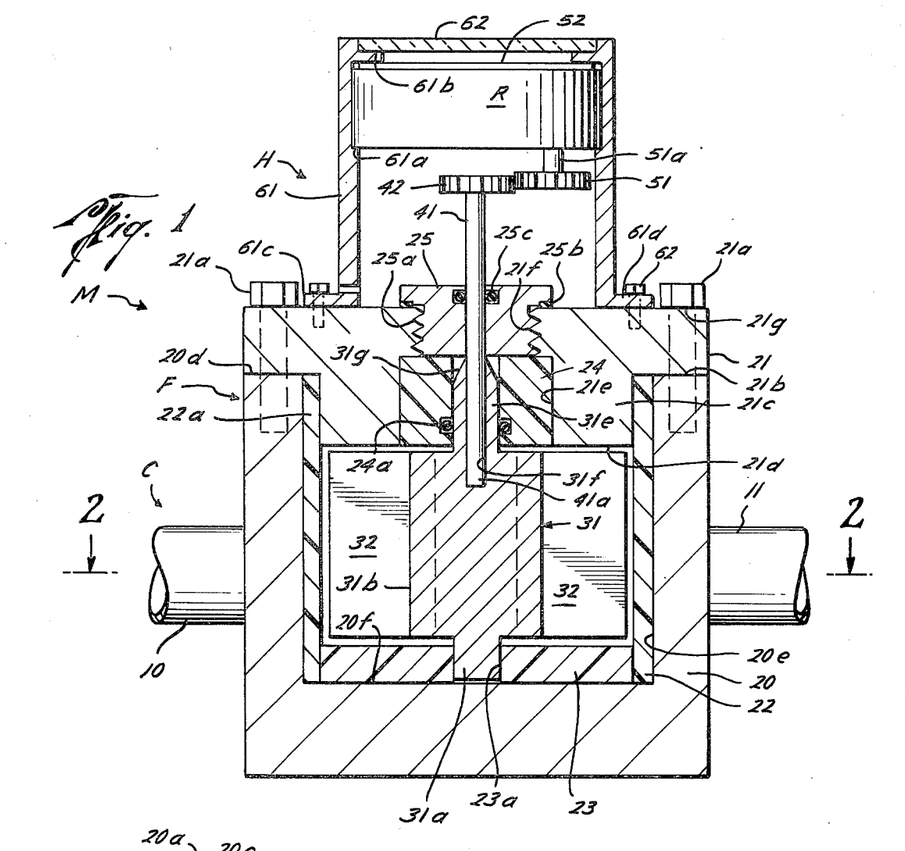
FIG. 1 is an elevation view, partly in section, of the fluid meter of the present invention having a rotor and paddle arrangement for the movable member.

The fluid chamber F is mounted with the conduit system C transporting the fluid to be measured by the meter M, and receives the incoming fluid from an inlet pipe 10 and conveys such fluid to an outlet pipe 11 after the fluid has passed through the meter M. The fluid chamber F includes a lower chamber member 20 and an upper chamber member 21 mounted to the lower member 20 by a plurality of bolts 21a or other suitable fastening means along a surface 21b. An inwardly extending shoulder portion 21c, of slightly smaller exterior diameter than the interior diameter of the lower body member 20, for reasons to be more evident hereinbelow, extends from the surface 21b of the upper body member 21 into the lower body member 20 and forms one wall of the cylindrical fluid cavity along an end surface 21d.

Figure 2:
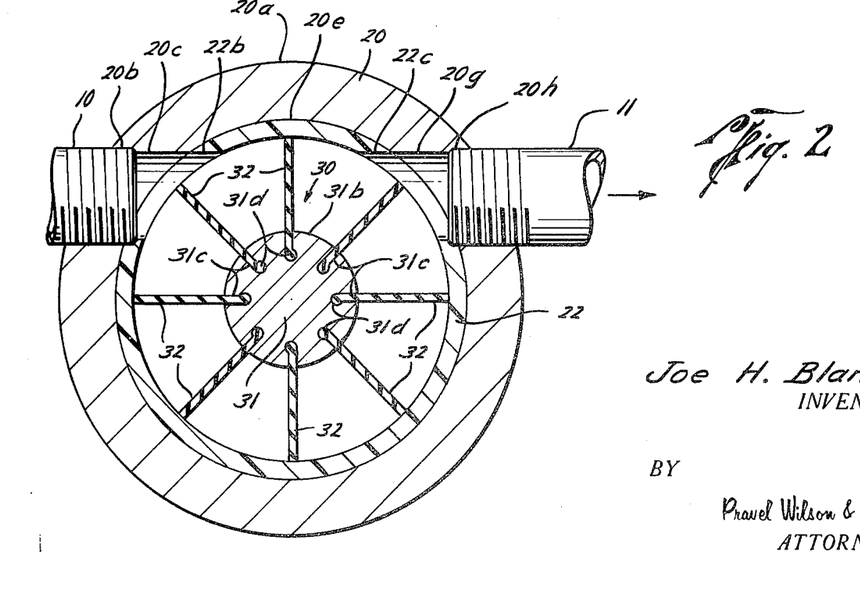
FIG. 2 is a cross-sectional view taken along the line 2—2 of FIG. 1.

The lower body member 20 has a threaded socket or connection 20b (FIG. 2) formed therein to receive the inlet conduit 10 and mount such inlet conduit 10 with the fluid chamber F. A passageway 20c is formed in the lower body member 20 and conducts the fluid from the inlet conduit 10 into the fluid cavity formed within the lower chamber member 20. A cylindrical cavity is formed in the lower chamber member 20 extending from an upper surface 20d of such chamber member along a cylindrical wall 20e to an inner circular base wall 20f. The diameter of the cylindrical cavity between the cylindrical walls 20e is slightly larger than the exterior diameter of the shoulder 21c of the upper chamber member 21 in order that a protective cylindrical sleeve 22 of teflon or other suitable material may be mounted between the shoulder 21c and the cylindrical wall 20e. The protective sleeve 22 forms a wall of the cylindrical fluid cavity within the fluid chamber F and provides a wear-resistant and protective surface for the wall of the fluid cavity, increasing the service life of the meter M. An upper portion 22a of the sleeve 22 held between the shoulder 21c and the cylindrical wall 20e provides a sealing action and prevents the fluid being measured by the meter M from leaking or otherwise escaping from the fluid chamber F.

A cylindrical passageway 22b is formed passing through the protective sleeve 22 adjacent the inlet passageway 20c permitting the incoming fluid to enter the cylindrical fluid cavity. A passageway 22c is formed in the sleeve 22 along a common axis to the passageway 22b to permit the fluid to pass from the cylindrical fluid cavity to a passageway 20g in the lower chamber member 20. The passageway 20g connects the fluid cavity to the outlet conduit 11 which is mounted with the fluid chamber F at a threaded socket or connection 20h.

A flat circular base support plate 23, of like material to the protective sleeve 22, is mounted on the lower base wall 20f of the chamber member 20 interiorly of the protective sleeve 22 to form a lower wall of the cylindrical fluid cavity within the fluid chamber F. A cylindrical mounting aperture 23a is formed in the center of the base support plate 23 to receive and support a lower portion 31a of a rotor 31. The base support plate 23 provides a firm and wear-resistant support for the rotor 31, retaining such rotor concentrically mounted within the cylindrical fluid cavity in the fluid chamber F, for reasons to be more evident hereinbelow.

A rotatable fluid flow sensing means 30 mounted within the fluid cavity in the fluid chamber F includes the rotor 31 and a plurality of radially outwardly extending rotor blades 32 mounted with the rotor 31. As has been set forth hereinabove, the lower portion 31a of the rotor 31 is mounted with the base support plate 23 in the fluid chamber F. A plurality of mounting notches 31c, like in number to the number of blades 32 mounted with the rotor 31 are formed in a middle portion 31b of the rotor 31 to receive the blades 32. An enlarged locking slot 31d (FIG. 2) is formed inwardly of each of the mounting grooves 31c to hold and maintain the blades 32 firmly in position with respect to the rotor 31.

An upper portion 31e of the rotor 31 is mounted within an annular mounting support 24 above the fluid cavity in the fluid chamber F. The annular mounting support 24 is of like material to the base support plate 23 and is mounted within a cylindrical counter bore in the surface 21d of the upper chamber member 21 adjacent a cylindrical surface 21e. An O-ring 24a or other suitable annular sealing means is mounted within a groove formed in the annular mounting support 24 to prevent leakage of the fluid being measured.

The base support plate 23 and the annular mounting support 24 maintain the rotor 31 concentrically mounted within the fluid cavity in the fluid chamber F and hold such rotor in a position so that the incoming fluid coming into contact with the blades 32 causes the fluid flow sensing means 30 to rotate concentrically about its center axis within the fluid chamber F. The base plate 23 and mounting support 24 maintain and support the rotatable fluid flow sensing means at each end of its rotational axis, and firmly hold such sensing means in position, permitting the sensing means to rotate about its rotational axis and correctly indicate the amount of fluid flowing through the fluid chamber F, providing increased accuracy and sensitivity in the meter M as compared to the prior art meters, which suspended the rotor by supporting bushings and which would wear and allow the rotor to loosen and wobble during rotation, causing inaccurate measurements of the fluid passing through the meter M.

A cylindrical socket is formed in the upper portion 31e of the rotor 31 adjacent a cylindrical inner wall 31f thereof. The cylindrical socket extends along the rotational axis of the rotor 31 and has mounted therein a lower portion 41a of a shaft 41 of the drive means 40. The shaft 41 is firmly mounted with the rotor 31 in order that such shaft rotates in response to rotational movement of the fluid sensing means 30. The shaft 41 extends upwardly through a threaded plug 25 and the upper chamber member 21 into the register housing H to drive the register R, as will be more evident hereinbelow.

The plug 25 engages a threaded surface 21f of the upper chamber member 21 along a threaded exterior portion 25a and holds the annular mounting support 24 firmly in place to insure firm and stable support of the flow sensing means 30 in order to provide accurate measurement of the amount of fluid flowing through the meter M. An annular gasket 25b is mounted between the threaded plug 25 and an upper surface 21g of the chamber member 21 and provides a seal between the plug 25 and the fluid chamber F to prevent the fluid being measured from leaking or otherwise escaping from the fluid chamber F. An O-ring 25c or other suitable annular sealing means is mounted within an annular mounting slot in the threaded plug 25 adjacent the shaft 41 to further prevent leakage or escape of the fluid from the fluid chamber F.

A tapered surface 31g is formed on the upper portion 31e of the rotor 31 adjacent the tapered plug 25 to prevent undue contact and consequent frictional losses to thereby provide a sensitive and accurate measurement of the fluid by the meter M.

A single spur gear 42 is mounted with the shaft 41 to transmit the rotational movement sensed by the fluid flow sensing means 30 in the fluid chamber F to the register R. The single driving spur gear 42 engages and drives a single external spur gear 51 which transmits the rotational movement of the shaft 41 and rotor 31 to the register R through a shaft 51a. The single driving spur gear 42 and the single external gear 51 greatly simplifies and reduces the complexity, inefficiency, and size of the meter M over the prior art meters.

The register R is preferably a register or clock of the type disclosed in my co-pending U.S. patent application referenced hereinabove, now U.S. Pat. No. 3,735,102, although other types of registers or clocks may be used with the meter M. The register R is mounted within a register housing H on a shelf or ledge 61a. Indicating dials or other suitable indicating means are mounted on an upper surface 52 of the register R and are visible through a transparent plate of glass or plastic or other suitable material to indicate the amount of fluid flowing through the conduit C and measured by the meter M. The transparent plate 62 is mounted with a ledge or shelf 61b of the register housing 61 above the register R. The register housing 61 has an outwardly extending mounting flange 61c formed at a lower end 61d thereof so that bolts 62 or other suitable fastening means may be inserted through the mounting flange 61c to mount the register housing 61 to the upper chamber member 21.

In a modified meter M-1 (FIG. 1A) of the present invention, like parts to the meter M (FIG. 1) performing like functions bear like reference numerals. The lower portion of the fluid chamber F of the meter M-1 has been omitted from the drawings since such lower portion is of like structure and function and operation to the lower portion of the fluid chamber F of the meter M (FIG. 1). The inlet conduit 10 conveys the fluid to be measured into the fluid chamber F, and the outlet conduit 11 conveys such fluid from the fluid chamber F in a like manner to the like numbered structure of the meter M.

Figure 1A:
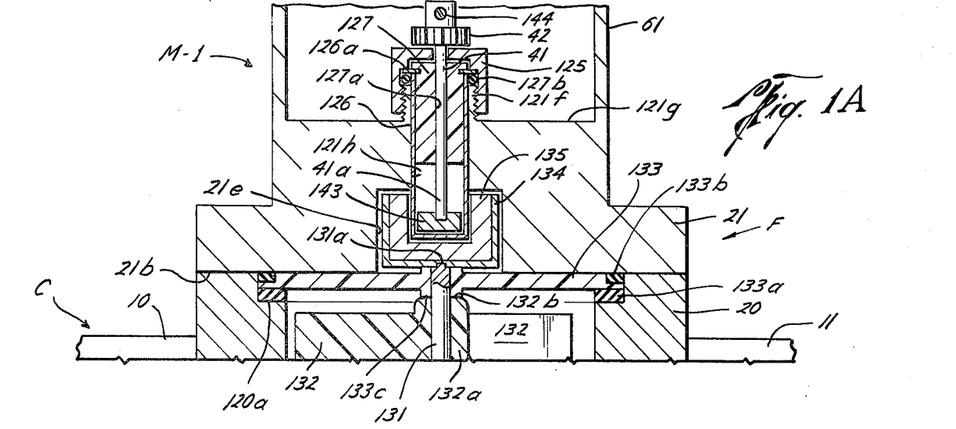
FIG. 1A is an elevation view, partly in section, of a modified embodiment of the fluid meter of FIG. 1.

In the fluid cavity of the meter M-1 a plurality of fluid flow sensing blades 132 are integrally formed and extend outwardly from a cylindrical collar 132a. The cylindrical collar 132a is firmly mounted with a shaft 131 and causes such shaft to rotate when the fluid in the fluid cavity contacts the blades 132 and causes such blades to rotate. The shaft 131 passes through an aperture in a circular sealing plate 133. The circular sealing plate 133 is held in place with respect to the fluid chamber F by a lower gasket 133a and by an upper gasket 133b between a ledge 120a in the lower chamber member 20 and a lower surface 21b of the upper chamber member 21. The sealing plate 133 prevents the fluid from escaping from the fluid cavity in the fluid chamber F. A lower portion 133c of the sealing plate 133 engages an upper surface 132b of the cylindrical collar 132a and holds the collar 132a and the blades 132 mounted therewith firmly in position to prevent undesirable movement and consequent inaccurate measurement of fluid flow by the meter M-1. The plate 133 also segregates the fluid cavity within the fluid chamber F from the drive shaft 41 and associated structure, as will be more evident hereinbelow. A protective sleeve and a base support plate of like structure to that previously set forth may be mounted in the fluid chamber of the meter M-1, if desired.

The shaft 131 extends through the sealing plate 133 and has a key or lug 131a extending upwardly therefrom. The key 131a is mounted within a slot or groove formed in a lower surface of a cup 134 preferably of non-magnetic material in order that rotation of the shaft 131 in response to fluid moving through the fluid cavity causes the cup 134 to rotate. A cup shaped permanent magnet 135 is mounted with the cup 134 to rotate therewith in response to the flow of fluids through the fluid chamber F.

The upper housing member 21 has the register housing 61 integrally formed therewith in the meter M-1. The upper portion of the register housing 61, including the single external spur gear 51 and drive shaft 51a, is like in structure and function to the like numbered structure of the meter M and has been removed from the drawing of the meter M-1 in order to maintain clarity in such drawing.

A threaded connector 121f is formed extending upwardly from a lower surface 121g within the register housing 61 and engages a threaded interior of a cap 125 which is mounted therewith. A capsule 126 with a relatively wide flange 126a at the upper end thereof for mounting such capsule within the cap 125 and the connector 121f, extends downwardly from the connector 121f within the upper member 21 adjacent the cup shaped permanent magnet 135 and the cup 134 mounted to the shaft 131. An O-ring 127b or other suitable annular sealing means is mounted between the flange 126a, the cap 125, the connector 121f and the capsule 126 to prevent dust, moisture or other undesirable elements from entering the interior of the capsule 126.

A stopper or plug 127 is snap fit or otherwise suitably mounted with the flange 126a of the upper end of the capsule 126 to likewise prevent undesirable particles or elements from entering the interior of the capsule 126. An aperture 127a is formed through the center of the plug 127 to permit passage therethrough of the shaft 41. A driven permanent magnet 143 mounted with the shaft 41 at a lower end thereof and responds to the magnetic flux from the driving permanent magnet 135 by rotatably moving in response to rotating movement of the cup shaped driving permanent magnet 135. The single driving spur gear 42 is mounted with the upper end of the shaft 41 and transmits the rotational movement caused by the driven permanent magnet 143 following the rotating cup shaped driving magnet 135 to the single external driven spur gear 51 which thereupon drives the register R through the drive shaft 51a, as has been previously set forth. The spur gear 42 and shaft 41 are mounted with the threaded cap 125 by a set screw and collar 144.

A fluid filter 80 (FIG. 1B) receives incoming fluid before such fluid passes into the meters M of the present invention and filters the fluid to remove particles, undesired matter and the like from such fluid. An inlet pipe 81 mounted longitudinally within the filter 80 receives the incoming fluid from a suitable switchable fluid conduit (not shown). The incoming fluid passes from the inlet pipe 81 through a plurality of perforations or apertures 81a formed in such pipe into a chamber 82 containing limerock chaff or other suitable filtering material.

Figure 1B:
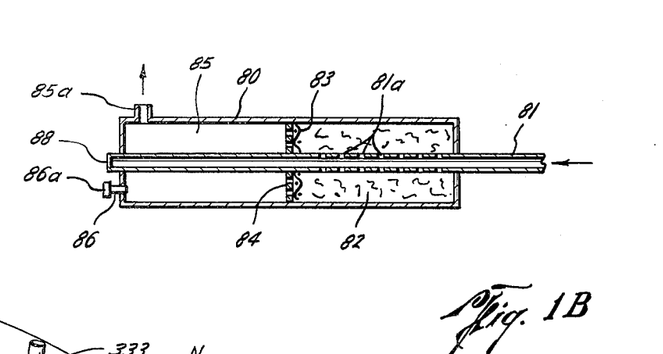
FIG. 1B is an elevation view, taken in section, of a filter used with the meters of the present invention.

A screen 83, formed of monel or other suitable material, forms a wall adjacent the chamber 82, and permits the fluid to pass from the chamber 82 through the screen 83 and a baffle plate 84, having a plurality of holes or baffles formed therein, into an outlet chamber 85. An outlet conduit 85a mounted with the filter 80 permits fluid to pass from the chamber 85 to conduits and to the meters M of the present invention.

A flushing inlet 86 is formed in the filter 80 adjacent the chamber 85. The flushing inlet 86 is normally scaled by a cap 86a, but is opened to permit flushing fluid to enter the chamber 85 to back wash and clean the baffle plate 84, screen 83, and filtering material in the chamber 82. A bull plug or plug 88 is formed at an end 81b of the inlet pipe 81 opposite the apertures 81a.

In the operation of the meters M and M-1, the incoming fluid whose flow is to be measured is conveyed into the fluid chamber F by the inlet conduit 10. The incoming fluid contacts the rotor blades and causes the rotor to rotate in response to the flow of such fluid.

The rotor 31 causes the shaft 41 to rotate, permitting the single driving spur gear 42 to rotate the single external driven gear 51. The rotation of the driven gear 51 is transmitted to the register R by a drive shaft 51, and the register R indicates the number of rotations of the rotor 31, and correspondingly the amount of fluid which has flowed in the conduit system C through the meter M during a given measurement interval.

In the meter M-1, rotation of the shaft 131 causes the cup shaped magnet 135 to rotate, as has previously been set forth, attracting the driven magnet 143, thereby rotating the shaft 41. The rotating shaft 41 causes the single driving spur gear 42 to rotate the single external driven spur gear 51, which is sensed by the register R in a like manner to that previously set forth to indicate the number of revolutions of the fluid flow sensing means in the fluid cavity, and consequently the amount of fluid which has flowed through the conduit system C in a predetermined measurement interval.

In an alternative fluid meter M-2 (FIG. 3) of the fluid meters of the present invention, like structure performing a like function to the structure of the meters M and M-1 bear like reference numerals.

Figure 3:
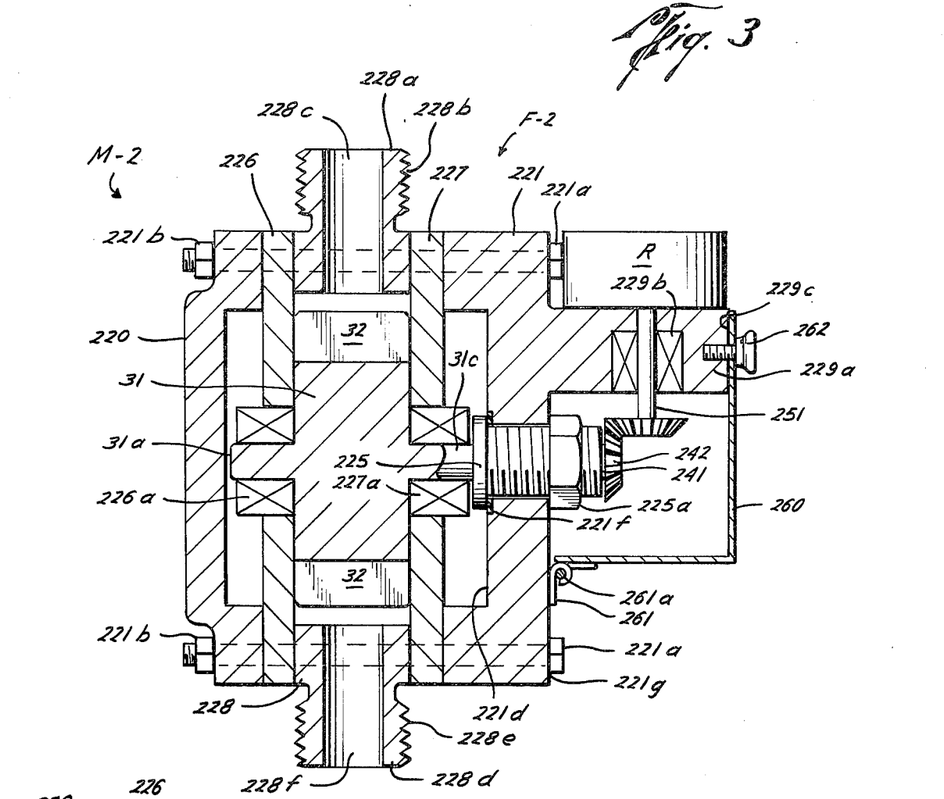
FIG. 3 is an elevation view partly in section, of another fluid meter of the present invention having a rotor and paddle arrangement for the movable member.

The meter M-2 includes fluid chamber F-2 which receives the fluid whose flow is to be measured and senses the flow of such fluid by the paddles 32 rotating in response to the fluid and causing rotational movement of the rotor 31 about its axis. The fluid chamber F-2 includes a plurality of side cover plates 220 and 221 which have a plurality of mounting plates 226 and 227 and a housing body 228 mounted therebetween. A plurality of bolts 121a and nuts 121b secure the cover plates 220 and 221, the mounting plates 226 and 227 and the housing body 228 to each other to form the fluid cavity through which the incoming fluid to be measured passes. The housing body 228 has an inlet nozzle 228a extending outwardly therefrom. A threaded exterior surface 228b is formed with the inlet nozzle 228 in order that the inlet conduit may be mounted with the inlet nozzle. The fluid flowing in the inlet conduit passes into a passageway 228c formed in the inlet nozzle 228 and into the fluid cavity within the fluid chamber F-2.

An outlet nozzle 228d is formed extending outwardly from the housing body 228, and has a threaded exterior surface 228e formed thereon in order that an outlet conduit may be conected to the meter M-2. The fluid which causes the blades 32 and the rotor 31 to rotate passes from the fluid chamber F-2 into the outlet conduit through an outlet passageway 228f formed in the outlet nozzle 228d.

A ball bearing 226a or other suitable means to permit free rotational movement of the rotor 31 with respect to the mounting plate 226 is mounted with the mounting plate 226. The end 31a of the rotor 31 is mounted within the ball bearing 226a. Similarly, a ball bearing 227a is mounted with the mounting plate 227 and receives the end 31c of the rotor 31 to permit rotational movement of the rotor 31 with respect to the mounting plates 227. The double support provided for the rotor 31 by the ball bearings 226a and 227a reduces the undesirable wobbling and other movement of the rotor 31 with respect to its rotational axis in order to increase the accuracy and sensitivity of the fluid meter M-2 to the fluid flowing therein.

In the fluid meter M-2, a drive shaft 241 is integrally formed with the end portion 31c of the rotor 31 and thus moves with the rotor 31 in response to the fluid moving the blades 32 in the fluid chamber F-2. The drive shaft 241 is freely rotatably movable and mounted within a hollow rotor support plug or bolt 225. The rotor support bolt 225 is mounted with the cover plate 221 by a nut 225a or other suitable fastening means. A gasket 221f or other suitable annular sealing means is mounted between the bolt 225 and an interior surface 221d of the cover plate 221.

A single driving bevel gear 242 is mounted with the drive shaft 241 and transmits the rotational movement of the drive shaft 241 to a single external driven bevel gear 251. The single external driven bevel gear 251 is mounted with a shaft 251a which transmits the movement of the driven bevel gear 251 to the register R in order that the register R may indicate the amount of fluid which has passed through the meter M-2.

An outwardly extending mounting arm 229 is integrally formed with the cover plate 221 and has a cylindrical counter bore 229a formed therein. A ball bearing 229b or other suitable means to permit rotational movement of the shaft 251 with respect to the mounting arm 229 is inserted in the counter bore 229a and mounted with the mounting arm 229.

As has been set forth with respect to the other embodiments of the fluid meters of the present invention, the fluid meter M-2 preferably includes a clock or register R of the type set forth and disclosed in my co-pending patent application referred to hereinabove, although other registers and clocks may be used, if desired.

A protective cover or plate 260 which prevents moisture, dust or other undesirable elements from contacting the bevel gears 242 and 251 is pivotally mounted at a pin 261a to an outer surface 221g of the cover plate 221. A coil spring 261, or other suitable resilient means holds the protective cover 260 firmly against an outer surface 229c of the mounting arm 229 and prevents undesirable movement of the protective housing 260. A mounting or fastening screw 262 is inserted through an aperture formed in the housing 260 into a threaded socket in the mounting arm 229 to secure and close the protective housing 260 and prevent moisture, dust and other undesirable elements from contacting the bevel gears 242 and 251.

Figure 3A:
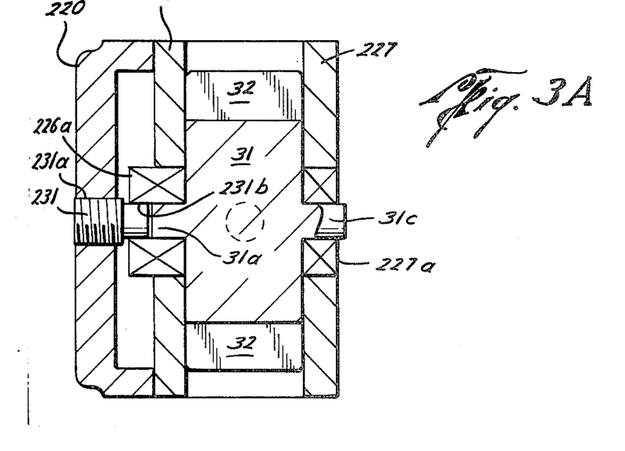
FIG. 3A is an elevation view, partly in section, of a modified embodiment of the fluid meter of FIG. 3.

The threaded support screw 231 (FIG. 3A) may be inserted and mounted with the support plate 220 along an exterior surface 231a and extend through the support plate 220 to engage the ball bearing 226a along a threaded exterior portion 231b. The support screw 231 provides additional support for the rotor 31 and protects against wobbling and other undesirable movement of the rotor 31 in order to increase the accuracy and sensitivity of the meter M-2.

In a meter M-3 (FIG. 4) and a meter M-4 (FIG. 4A) of the present invention, a nutating disk chamber N (FIG. 5) is used to sense the flow of fluid through such meters in order that the amount of fluid flowing through the conduits may be measured by such meters. The nutating disk chamber N is formed by a lower chamber member 320 and an upper chamber member 321 which are snap fit or otherwise suitably mounted to each other.

Figure 5:
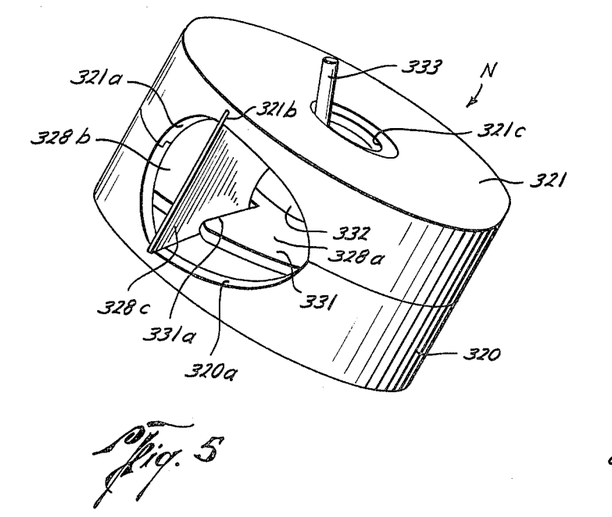
FIG. 5 is an isometric view of a fluid chamber having a nutating disk mounted therein for use in the fluid meter of FIG. 4.

A portion of the lower chamber member 320 adjacent a surface 320a and a portion of the upper chamber member 321 adjacent a surface 321a are removed from the chamber members to form an opening or orifice 328 to allow the fluid to enter the nutating disk chamber N. The opening 328 is divided into an inlet opening 328a and an outlet opening 328b by a diaphragm or blade 328c which is held in place within a slot 321b in the upper chamber member 321.

A nutating disk 331 is mounted within the chamber N, and a groove 331a through which the blade 328c is mounted is formed in such disk. The blade 328c passing through the groove 331a permits the disk 331 to nutate or wobble and diverts the incoming fluid as the fluid enters the inlet opening 328a and passes through the interior of the disk chamber N to pass from such chamber through the outlet opening 328b.

A ball or sphere 332 which is freely movable in sockets in the interior of the upper chamber member 321 and the lower chamber member 320 has the disk 331 mounted at the periphery or outer surface thereof. The ball 332 moves freely within the mounting sockets as the disk 331 nutates in response to the fluid passing through the disk chamber N. A stem 333 is mounted with the ball 332 and extends upwardly from the disk chamber N through a circular orifice or aperture formed adjacent a surface 321c in the upper chamber member 321. As the disk 331 nutates in response to the fluid flowing through the chamber N, the stem 333 moves in a circular path remaining in contact with the surface 321c.

Figure 4:
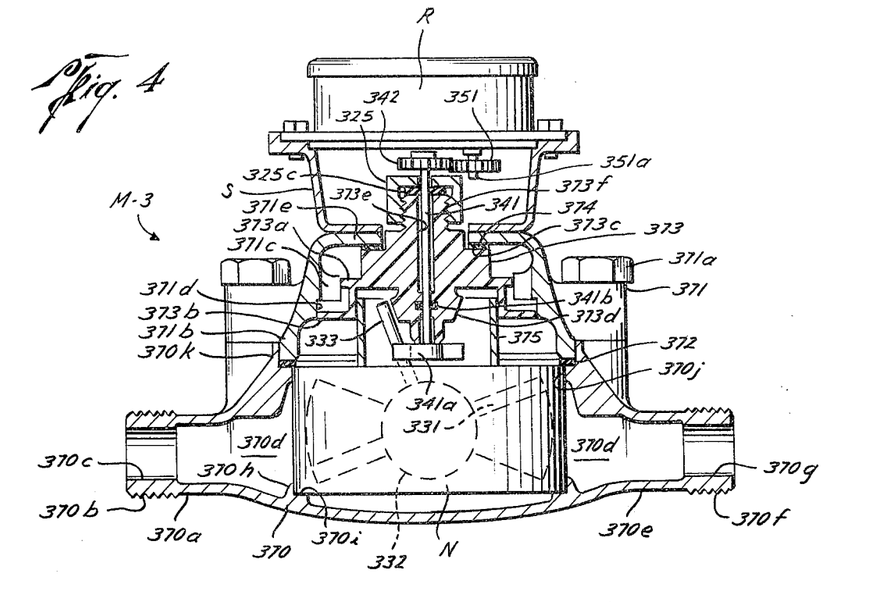
FIG. 4 is an elevation view, partly in section, of a fluid meter of the present invention having a nutating disk for the movable member.

The disk chamber N is mounted between a lower casing 370 and an upper casing 371 in the meter M-3 (FIG. 4). The lower casing 370 has an inlet nozzle 370a extending outwardly therefrom. The inlet nozzle 370a has a threaded exterior surface 370b with which the inlet conduit is mounted. The fluid from the inlet conduit enters the inlet nozzle 370a through a passageway 370c and passes into an annular passageway 370d about the periphery of the nutating disk chamber N in order that the fluid may enter the inlet opening 328a of such chamber. Fluid passes through the chamber N and from the outlet opening 328b of such chamber into the passageway 370d.

An outlet nozzle 370e with a threaded exterior 370f for mounting of an outlet conduit conveys the fluid from the annular passageway 370d through an outlet passageway 370g into such outlet conduit.

The disk chamber N is mounted with a shoulder 370i formed on an upwardly extending portion 370h within the lower casing 370. The chamber N is also mounted and held in place by an upper cylindrical surface 370j in the lower casing 370 to hold such chamber firmly in place.

The upper casing 371 is mounted with the lower casing 370 by bolts 371a or other suitable mounting means. A downwardly extending shoulder 371b of the upper casing 371 fits within an upwardly extending rim or flange 370k of the lower casing 370 and engages and holds an annular gasket or sealing means 372 firmly in place. The gasket 372 is mounted between the shoulder 371b, the flange 370k and the nutating disk chamber N to assist in preventing the fluid being measured from seeping or leaking into the upper casing 371 and reducing the accuracy and service life of the meter M-3.

A support body 373 is snap fit or otherwise suitably firmly mounted along a pair of outwardly extending flanges 373a and 373b with an inwardly extending shoulder 371c and an inner surface 371d, respectively, of the upper casing 371. An annular gasket 374 is mounted between an upper surface 373c of the support body 373 and an upper portion 371e of the upper casing 371 to prevent fluid or moisture from passing from the inner casing 371 into the interior of a register support S.

A sleeve 375 is mounted with the disk chamber N and encloses the stem 333 and the opening formed adjacent the surface 321c of such chamber. The sleeve 375 extends upwardly into the support body 374. A tapered or conical guiding surface 373e extends downwardly into the sleeve 375 and provides a surface to guide and direct the travel of the stem 333 as the disk 332 in the chamber N wobbles or nutates in response to the passage of fluid through such chamber. A suitable annular seal may, if desired, be inserted between the sleeve 375 and the support body 371.

A cylindrical opening or passageway 373e is formed extending through the support body 373 and receives therein a shaft 341 which is driven in response to movement of the stem 333 by a driving dog or impeller 341a mounted at the lower end thereof. An O-ring 341b is mounted within an annular mounting socket adjacent the passageway 373e to prevent the fluid from entering the register support S. A threaded cap 325 is mounted with a threaded exterior upper surface 373f of the support body 373 and holds an annular gasket 325c between the cap 325 and the support body 373 for additional sealing to prevent fluid from entering the register support S and contacting the gears, as will be set forth hereinbelow.

The shaft 341 extends through an opening in the cap 325 and has a single driving spur gear 342 mounted at the upper end thereof. The driving spur gear 342 engages a single external driven spur gear 351 and drives such gear 351 in response to movement of the shaft 341. The gear 351 drives the register R by means of a shaft 351a.

As has been previously set forth, the register R is preferably of the type disclosed in my co-pending application referred to hereinabove, although other registers may be used if desired. The register R is mounted with the cup shaped register support S by a plurality of bolts 353 or other suitable mounting means. The register support S encloses the gears 342 and 351 and protects such from moisture, dust and other undesirable elements. The register support S is mounted with the upper portion 371e of the upper casing 371 in order that the register R may be mounted with the meter M-3.

In the meter M-4 (FIG. 4A) like parts performing like functions to the structure of the meters M-3, M-2 and M-1 bear like reference numerals. The magnetic driving arrangement for the gear 342 including the cup shaped magnet 135 and the driven permanent magnet 143 operate in a like manner to the magnetic driving arrangement of the meter M-1 (FIG. 1A). As the stem 333 of the chamber N moves in response to the passage of fluid through such chamber, the driving dog or arm 341 is driven, causing the shaft 341 to rotate. The rotating shaft 341 causes the cup shaped magnet 135 to move with respect to the driven magnet 143, and the magnetic linkage between such magnets causes the magnet 143 to follow the moving driving magnet 135, causing the shaft 41 to rotate and by means of the single driving spur gear 342 drive the single external spur gear 351 and cause the register R to indicate the amount of fluid flowing through the meter M-4.

An alternative or adapter gear drive arrangement G (FIG. 4B) may be used to replace the gear drive arrangement in the meters M of the present invention, for example, the meters M-1 and M-4, and to modify other fluid meters in accordance with the present invention to provide the accuracy, durability, increased service life and other advantages of the meters of the present invention.

Figures 4A, 4B:
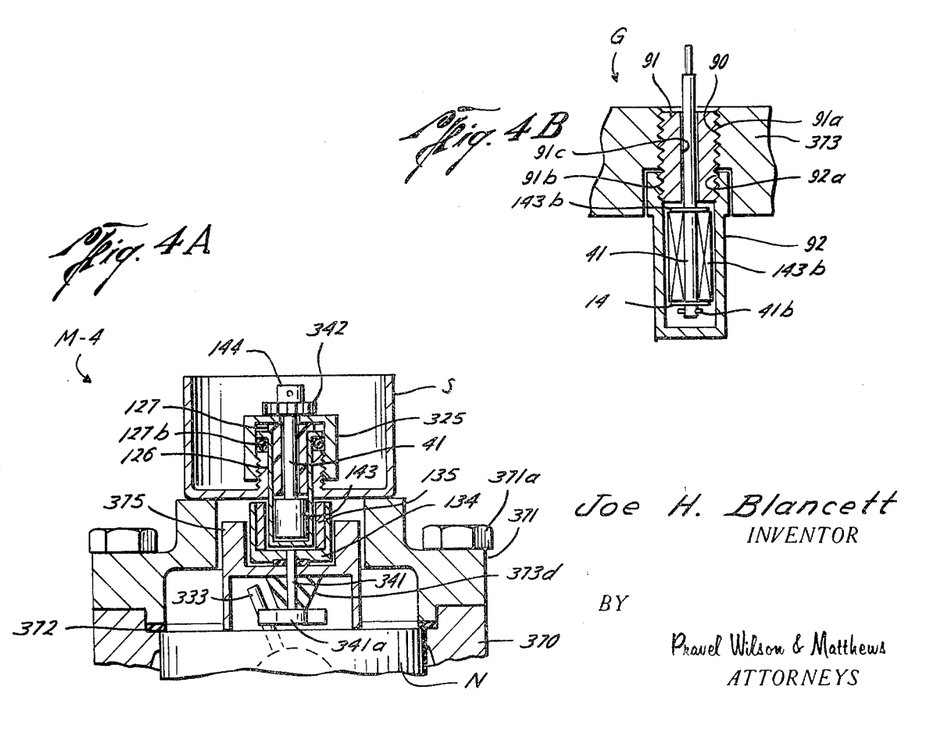
FIG. 4A is an elevation view, partly in section, of a modified embodiment of the fluid meter of FIG. 4.
FIG. 4B is a cross-sectional view of an alternative drive means for the meters of the present invention.

A threaded socket 90 is formed in the meter M when such meter is modified to receive the gear drive arrangement G. A threaded plug or adapter 91 is mounted at an upper end 91a thereof with the socket 90. A case 92 is mounted at a threaded surface 92a with a lower end 91b of the plug 91 within the meter M.

In the accompanying drawings, the drive arrangement G is used with the meter M-3, and like structure performing like function bears like numerals. It should be understood however that the meters M, M-1, M-2, and M-4, as well as other meters can be suitably modified in a like manner to operate with the drive arrangement G. The shaft 41 driving the external driving spur gear 342 passes through an opening 91c formed in the plug 91.

The driven magnet 143 is mounted at the lower end of the shaft 41 within the case 92, sensing and responding to rotational movement of the cup shaped magnet 135 due to fluid flow of the meter M and transmitting such movement to the gear 342 to drive the register R in order to register and indicate the fluid flowing in the conduit system C. A plurality of outwardly extending lugs 41b are formed at the lower end 41a of the shaft 41 to support and retain the magnet 143 with the shaft 41. A plurality of bushings 143b, formed from delrin or other suitable synthetic resin or material, are mounted on the shaft 41 at the upper and lower ends of the magnet 143 to provide further support for the magnet 143 and to reduce friction during rotational movement thereof.

In an alternate embodiment, meter M-5 (FIG. 6) of the present invention, like parts to the meters M and M-1 (FIGS. 1 & 1A) performing like functions bear like reference numerals. The lower portion of the fluid chamber F of the meter M-5 has been omitted from the drawings since such lower portion is of like structure and function and operation to the lower portion of the fluid chamber F of the meter M (FIG. 1). The inlet conduit 10 conveys the fluid to be measured into the fluid chamber F, and the outlet conduit 11 conveys such fluid from the fluid chamber F in a like manner to the like numbered structure of the meter M.

Figure 6:
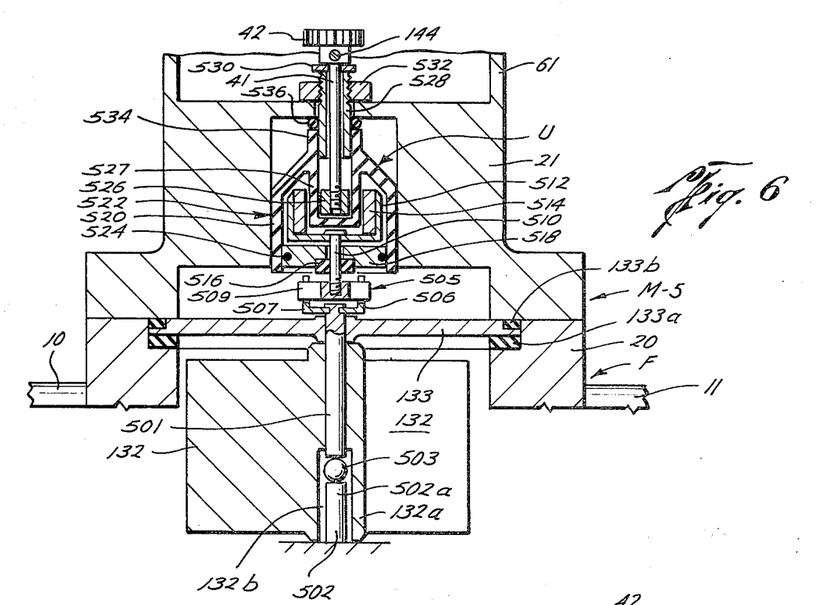
FIG. 6 is a cross-sectional view of an alternative embodiment of the meter of FIG. 1 using the adapter unit of the present invention.

In the fluid cavity of the meter M-5 a plurality of fluid flow sensing blades 132 are integrally formed and extend outwardly from a cylindrical collar 132a. The cylindrical collar 132a has a central opening 132b formed therein along its axis of rotation. A shaft 501 extends downwardly into the central opening 132b and upwardly therefrom through an aperture in a circular sealing plate 133. The circular sealing plate 133 is held in place with respect to the fluid chamber F by a lower gasket 133a and by an upper gasket 133b between a ledge 120a in the lower chamber member 20 and a lower surface 21b of the upper chamber member 21. The sealing plate 133 prevents the fluid from escaping from the fluid cavity in the fluid chamber F. A lower portion 133c of the sealing plate 133 engages an upper surface 132b of the cylindrical collar 132a and holds the collar 132a and the blades 132 mounted therewith firmly in position to prevent undesirable movement and consequent inaccurate measurement of fluid flow by the meter M-1. The plate 133 also segregates the fluid cavity within the fluid chamber F from the drive shaft 41 and associated structure, as will be more evident hereinbelow.

A lower support shaft 502 extends upwardly into the opening 132b, and has a spherical support or ball bearing 503 mounted therewith at an upper end 502a. The ball bearing 503 provides a point contact support within the rotatable flow sensing blades 132 which is not directly exposed to the fluid in the fluid chamber F. The ball bearing 503 further provides a stable support for the rotatable blades 132 during movement thereof due to the point contact provided between the ball bearing 503 and the shafts 501 and 502.

The shaft 501 extends through the sealing plate 133 and has a yoke 505 with arms 506 and 507 extending upwardly therefrom. The arms 506 and 507 engage a rotor blade 509 of an adapter unit U and moves such blade 509 so that rotation of the shaft 501 in response to fluid moving through the fluid cavity is transmitted through the adapter unit U to the shaft 41 and gear 42 driving the register R.

Considering the adapter unit U more in detail, a drive shaft 510 connects the rotor blade 509 to a support cup 512 at an upper stud which contains an annular driving magnet 514 therein. The drive shaft extends through an opening in a sealing gasket 516 which is mounted in a lower closure plate member 518.

The closure plate member 518 is preferably formed from a suitable synthetic resin and is mounted within a cylindrical lower sleeve portion 520 of an upper enclosure member 522, with an O-ring 524 or other suitable sealing means mounted between the plate 518 and sleeve 520. The enclosure member 522 is preferably formed from a suitable synthetic resin, also. The enclosure member 522 and the plate 518 form a fluid-tight capsule, enclosing both the driving magnet 514 and a driven magnet 526 therein, protecting the magnets 514 and 526 from particulate matter and corrosive components of the fluid whose flow is being measured, while permitting the magnets 514 and 526 to be positioned adjacent each other with only a relatively thin magnetically permeable cup member 527 therebetween, thereby increasing measurement accuracy and sensitivity. The cup member 527 further serves as a guide post for stem 510, cup 512 and magnet 514 during rotational movement thereof.

The driven magnet 526 is mounted at a threaded lower end of the shaft 41 which extends upwardly through a mounting sleeve 528 to the collar 144 which mounts the spur gear 42 to the shaft 41. The ferrule or washer 530 is mounted at an upper end of the mounting sleeve 528 enclosing the shaft 41. The mounting sleeve 528 has a threaded exterior upper surface which engages a threaded inner surface of a mounting washer 532, thereby mounting the adapter unit U in position in the counterbore of the meter M-5.

The mounting sleeve extends downwardly through the opening in register housing 61 and upper body member 21 into an upper sleeve portion 534 of the enclosure member 520. An O-ring 536 or other suitable sealing means forms a seal at the connection between the sleeve 534 of enclosure member 20, the mounting sleeve 528 and the openings in the register housing 61 and body member 21.

A meter M-6 (FIG. 7) uses the adapter unit U or interconnect and transmit movement between a stem 333 of a nutating disk flow sensing chamber N and a driving gear 342. In the meter M-6, like structure to like structure of other meters set forth above bears like reference numerals. Since structural details and operating features of the adapter unit U have been set forth in detail above, they will not be repeated in detail with respect to the meter M-6. In the meter M-6, an upper housing 538 of simplified construction is used, since the adapter unit U requires only a cylindrical counterbore for mounting.

It is to be noted that the adapter unit U, in addition to being especially suitable for use as a component of fluid meters M-5 and M-6, in the manner set forth above, may also be used as a replacement unit for maintenance, repair and re-service of worn mechanical gears in other types of worn fluid meters.

When so used, the adapter unit U replaces the cumbersome and often rusted mechanical gears and interconnects the flow sensor, either nutating disk or rotary plates, and a flow indicating register, increasing the service life of the meter and the accuracy of the register readings, as well.

When repair or re-service of a nutating disk fluid meter becomes necessary, the inner liner of the meter flow housing has often become worn and eroded, due to the corrosive action of fluid components and wearing action of particulate matter in the fluid. In such instances, proper positioning and alignment of the nutating disk chamber N in the meter housing is difficult to obtain. Another particularly prevalent place for wear in a meter housing for a nutating disk flow meter is at a wall portion 370k (FIG. 8) separating the inlet and outlet of the disk chamber N where continuing slight movements of the disk or blade during use of the meter causes a notch or groove 370l to form. Still another problem arises due to the accumulation of debris in the nutating disk chamber N at the outlet thereof behind the outlet surface 320a (FIG. 5) impairing movement of the disk 331.

A nutating disk chamber N-1 (FIGS. 7 and 8) of the present invention is adapted for use when repair or re-service of such worn nutating disk meters is necessary. In the nutating disk chamber N-1, like structure to that of the disk chamber N (FIG. 5) bears like reference numerals.

Figures 7, 8:
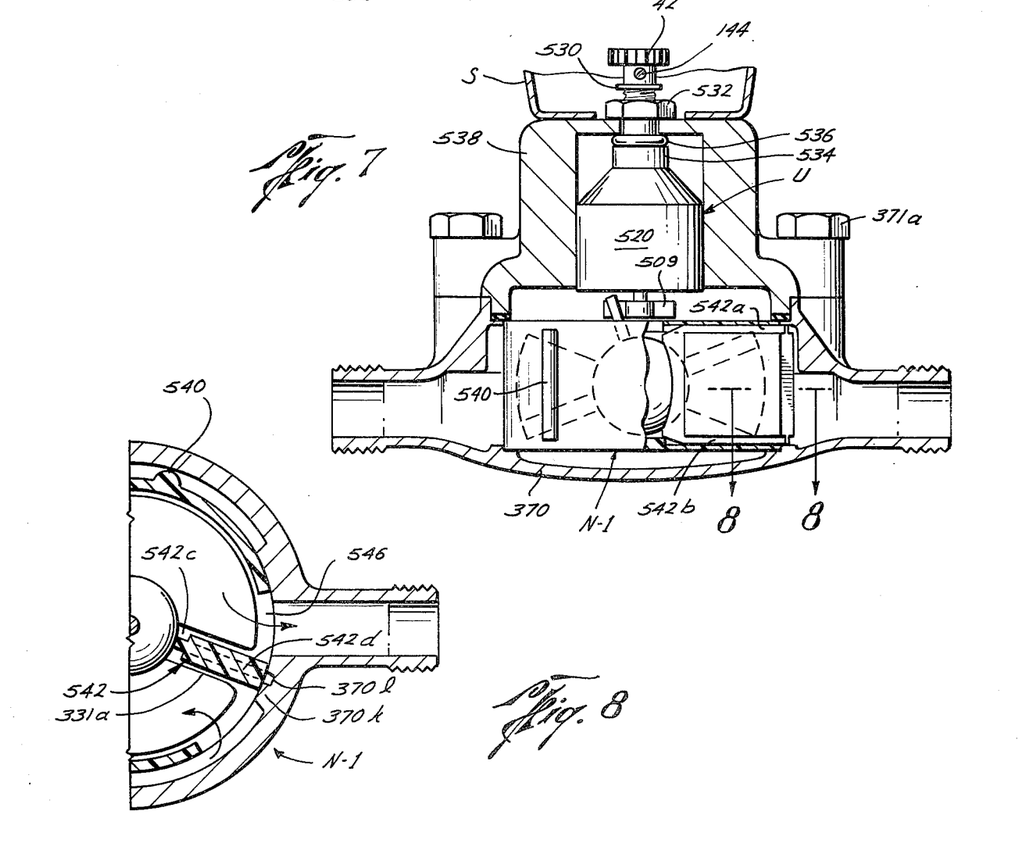
FIG. 7 is a cross-sectional view of an alternative embodiment of the meter of FIG. 4 using the adapter unit of the present invention.
FIG. 8 is a cross-sectional view taken along the lines 8—8 of FIG. 7.

A plurality of raised ribs 540 are formed on the outer surfaces of the chamber member 320 and 321. The ribs 540 permit the chamber N-1 to be mounted firmly in proper position, even in eroded or worn meter housings, extending outwardly from the chamber member outer surfaces to firmly engage the eroded or worn walls and properly seat and position the chamber N-1 in the meter housing 370.

A divider plate or blade 542 of the nutating disk chamber N-1 is mounted in the chamber N-1 adjacent the wall 370k in the meter housing 370. The blade 542 is mounted in the groove 331a in the nutating disk to separate the inlet and outlet portions of the chamber N-1.

The blade 542 has a thickened or enlarged cross-section intermediate upper portion 542a and 542b and extending outwardly from an inner portion 542c to an outer end 542d adjacent the notch 370l formed in the wall 370k. The blade 542 offers of the chamber N-1 increased strength against fluid pressure of the fluid whose flow is being measured, and additionally prevents seepage or bypass of fluid through the groove 370l which bypass fluid would not pass through the chamber N to be measured. Thus, the blade 542 increases accuracy of the meter readings.

At the outlet of the chamber N-1, a portion of the lower chamber member 320 is removed, as indicated by a phantom line 544 (FIG. 5) in the chamber N to thereby form a lower outlet 546 substantially level with a lower inner surface of the disk chamber N-1. With the lower outlet 546 of the chamber N-1, accumulation of particulate matter at the outlet port is prevented, further increasing the accuracy of flow measurement.

The foregoing disclosure and description of the invention are illustrative and explanatory thereof, and various changes in the size, shape, and materials as well as in the details of the illustrated construction may be made without departing from the spirit of the invention.

What is claimed is:

1. A fluid meter for measuring the amount of fluid flowing through a conduit, comprising:
   fluid chamber means for receiving incoming fluid from the conduit, said fluid chamber means having an outlet for outgoing fluid, said fluid chamber means being formed between a lower body member and an upper body member, said upper body member having a counterbore formed therein adjacent said fluid chamber means;
   rotatable means rotating about an axis transverse to flow of fluid in said fluid chamber means for sensing the flow of the fluid;
   drive means responsive to said rotatable means, said drive means having a single driving gear mounted therewith;
   magnetic means responsive to said rotatable means for propelling said drive means, said magnetic means comprising:
   a driving magnet moving in response to rotation of said rotatable means;
   a driven magnet moving in response to said driving magnet;
   a fluid-tight capsule for enclosing said driven magnet and said driving magnet, said capsule comprising:
   an enclosure member having an upwardly opening cup formed in an upper portion thereof for receiving said driven magnet therein;
   a sleeve member formed at a lower portion of said enclosure member and defining, in conjunction with said cup, a chamber for said driving magnet;
   said cup further being of a magnetically permeable material and serving as a guide for said driving magnet during movement thereof;
   a closure plate mounted at a lower end of said sleeve member for closing said chamber for said driving magnet;

means for forming a seal between said closure plate and said sleeve member;

a mounting sleeve extending upwardly for mounting said capsule in said counterbore in said upper body member;

means for sealing between said mounting sleeve and said upper body member; and means for engaging said mounting sleeve for mounting said capsule in said counterbore in said upper body member; and register means responsive to said drive means for indicating the amount of flow of the fluid, said register means having a single external gear engaging said single driving gear of said drive means, wherein the complexity and size of the fluid meter is reduced.

2. The structure of claim 1, wherein said rotatable means has an opening formed therein along its axis of rotation and further including support means for supporting said rotatable means, said support means comprising:

a lower support shaft extending upwardly into said opening in said rotatable means; and spherical support means mounted with an upper end of said lower support shaft, said spherical support means providing stable support for said rotatable means during movement thereof.

3. A fluid meter for measuring the amount of fluid flowing through a conduit, comprising:

fluid chamber means for receiving the incoming fluid conduit, said fluid chamber means having an outlet for the outgoing fluid, said fluid chamber means being formed between a lower body member and an upper body member, said upper body member having a counterbore formed therein adjacent said fluid chamber means;

nutating disk means for sensing the flow of the fluid;

drive means responsive to said nutating disk means, said drive means having a single driving gear mounted therewith; and magnetic means responsive to said nutating disk means for propelling said drive means, said magnetic means comprising:

a driving magnet moving in response to movement of said nutating disk means;

a driven magnet moving in response to said driving magnet;

a fluid-tight capsule for enclosing said driven magnet and said driving magnet, said capsule comprising:

an enclosure member having an upwardly opening cup formed in an upper portion thereof for receiving said driven magnet therein;

a sleeve member formed at a lower portion of said enclosure member and defining, in conjunction with said cup, a chamber for said driving magnet;

said cup further being of a magnetically permeable material and serving as a guide for said driving magnet during movement thereof;

a closure plate mounted at a lower end of said sleeve member for closing said chamber for said driving magnet;

means for forming a seal between said closure plate and said sleeve member;

a mounting sleeve extending upwardly for mounting said capsule in said counterbore in said upper body member;

means for sealing between said mounting sleeve and said upper body member; and means for engaging said mounting sleeve for mounting said capsule in said counterbore in said upper body member; and register means responsive to said drive means for indicating the amount of flow of the fluid, said register means having a single external gear engaging said single driving gear of said drive means, wherein the complexity and size of the fluid meter is reduced.

4. A fluid meter for measuring the amount of fluid flowing through a conduit, comprising:

a fluid chamber receiving incoming fluid, said fluid chamber having an outlet for outgoing fluid, said fluid chamber being formed between a lower casing member and an upper casing member, said upper casing member having a counterbore formed therein;

a nutating disk chamber mounted in the fluid chamber and receiving the incoming fluid;

a nutating disk in said nutating disk chamber nutating in response to the flow of fluid therethrough;

a stem mounted with said nutating disk and moving in a circular path in response to nutating movement of said nutating disk;

a shaft rotating in response to movement of the stem in the circular path;

a cup member mounted with said shaft;

an annular driving magnet mounted with said cup member with said shaft and moving therewith;

a driven magnet magnetically coupled with said annular driving magnet and moving in response to movement of said driving magnet;

a register responding to movement of the driven magnet to indicate the amount of fluid measured;

a register support mounted with said upper casing member for supporting the register; and a capsule containing said cup member, said driven magnet and said driving magnet therein, said capsule comprising:

an enclosure member having an upwardly opening cup formed in an upper portion thereof for receiving said driven magnet therein;

a sleeve member formed at a lower portion of said enclosure member and defining, in conjunction with said cup, a chamber for said driving magnet;

said cup further being of a magnetically permeable material and serving as a guide for said driving magnet during movement thereof;

a closure plate mounted at a lower end of said sleeve member for closing said chamber for said driving magnet;

means for forming a seal between said closure plate and said sleeve member;

a mounting sleeve extending upwardly for mounting said capsule in said counterbore in said upper body member;

means for sealing between said mounting sleeve and said upper body member; and means for engaging said mounting sleeve for mounting said capsule in said counterbore in said upper casing member to permit magnetic coupling between said driving magnet and said driven magnet while protecting said driving magnet and said driven magnet from corrosive action of the fluid being measured.

5. The structure of claim 4, wherein said nutating disk chamber has inlet and outlet ports formed therein for inlet and outlet, respectively, of fluid from said inlet and said outlet of said fluid chamber, and further including:
- a divider plate mounted in said nutating disk chamber in a groove formed in said nutating disk, said divider plate separating said inlet and outlet ports in said disk chamber, said divider plate having an enlarged cross-section at an outer end thereof adjacnet said inlet and outlet ports in said disk chamber for increased strength against fluid pressure.

6. The structure of claim 4, wherein said nutating disk chamber has an outlet port formed therein adjacent said fluid chamber outlet, and wherein:
- said outlet port includes a lower outlet formed substantially level with a lower inner surface of the nutating disk chamber to prevent accumulation of particulate matter in the disk chamber at said outlet port.

7. An adapter unit for replacing mechanical gears in a fluid meter counterbore which interconnect a flow sensor and a flow indicating register, comprising:
- a driving magnet moving in response to rotation of the flow sensor in the fluid meter;
- a driven magnet moving in response to said driving magnet and driving the flow indicating register;
- a capsule for enclosing said driving magnet and said driven magnet said capsule comprising:
- an enclosure member having an upwardly opening cup formed in an upper portion thereof for receiving said driven magnet therein;
- a sleeve member formed at a lower portion of said enclosure member and defining, in conjunction with said cup, a chamber for said driving magnet;
- said cup further being of a magnetically permeable material and serving as a guide for said driving magnet during movement thereof;
- a closure plate mounted at a lower end of said sleeve member for closing said chamber for said driving magnet;
- means for forming a seal between said closure plate and said sleeve member;
- a mounting sleeve extending upwardly for mounting said capsule in said counterbore in said upper body member;
- means for sealing between said mounting sleeve and said upper body member; and
- means for engaging said mounting sleeve for mounting said capsule in the fluid meter counterbore.

8. The structure of claim 7, wherein the adapter unit replaces mechanical gears in a nutating disk fluid meter, and further including:
- a nutating disk replacement chamber, said chamber being adapted to replace a worn nutating disk chamber in the meter flow housing and having ribs formed on the external surface thereof to insure proper positioning of said chambers against worn inner surfaces in the meter flow housing.

* * * * *